(12) United States Patent
Horikoshi et al.

(10) Patent No.: US 11,493,525 B2
(45) Date of Patent: Nov. 8, 2022

(54) DISPENSING UNIT

(71) Applicant: JVCKENWOOD Corporation, Yokohama (JP)

(72) Inventors: Katsue Horikoshi, Yokohama (JP); Makoto Itonaga, Yokohama (JP); Koji Tsujita, Yokohama (JP); Masayuki Ono, Yokohama (JP); Yuichi Hasegawa, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 419 days.

(21) Appl. No.: 16/817,950

(22) Filed: Mar. 13, 2020

(65) Prior Publication Data

US 2020/0217864 A1    Jul. 9, 2020

Related U.S. Application Data

(63) Continuation of application No. PCT/JP2018/009231, filed on Mar. 9, 2018.

(30) Foreign Application Priority Data

Sep. 25, 2017   (JP) .............................. JP2017-183591

(51) Int. Cl.
*B01L 3/00*    (2006.01)
*G01N 35/02*   (2006.01)
*B01L 3/02*    (2006.01)

(52) U.S. Cl.
CPC .............. *G01N 35/02* (2013.01); *B01L 3/021* (2013.01); *B01L 3/508* (2013.01)

(58) Field of Classification Search
CPC .......... G01N 35/02; B01L 3/021; B01L 3/508
USPC ...... 73/863, 864.21, 864.22, 864.51, 864.71, 73/864.73, 864.81, 866; 422/68.1, 521, 422/547, 554, 557, 559, 560, 561; 435/4–40.52, 325–408
See application file for complete search history.

(56) References Cited

FOREIGN PATENT DOCUMENTS

| CN | 105283249 | * | 1/2016 |
|---|---|---|---|
| JP | 59-29751 U | | 2/1984 |
| JP | 2004-239743 A | | 8/2004 |
| JP | 2013-50435 A | | 3/2013 |
| JP | 2017-58242 A | | 3/2017 |
| JP | 2017-138112 A | | 8/2017 |
| WO | 2016208713 A1 | | 12/2016 |

* cited by examiner

*Primary Examiner* — Robert R Raevis
(74) *Attorney, Agent, or Firm* — Nath, Goldberg & Meyer; Jerald L. Meyer (57) ABSTRACT

The dispensing unit includes a disc, a cartridge, and a dispensing holder. The disc has a disc shape and includes a track region provided with recesses and projections alternately arranged in a radial direction. The cartridge includes a penetration hole, and a well is formed by the penetration hole and the track region in a state in which the cartridge is attached to the disc. The dispensing holder includes a holding part to be inserted into the penetration hole, and a guide hole penetrating the holding part. The guide hole has a truncated cone shape in which a first opening diameter on the holding part side is smaller than a second opening diameter on a side opposite to the holding part, and a center line of the guide hole is located on a line passing through the center of the disc and the center of the well.

3 Claims, 9 Drawing Sheets

DISPENSING UNIT

CROSS REFERENCE TO RELATED APPLICATION

This application is a Continuation of PCT Application No. PCT/JP2018/009231, filed on Mar. 9, 2018, and claims the priority of Japanese Patent Application No. 2017-183591, filed on Sep. 25, 2017, the entire contents of both of which are incorporated herein by reference.

BACKGROUND

The present disclosure relates to a dispensing unit with which a solution such as a sample solution and a buffer solution are dispensed.

Immunoassays are known to quantitatively analyze disease detection and therapeutic effects by detecting particular antigens or antibodies as biomarkers associated with diseases.

Japanese Unexamined Patent Application publication No. 2017-58242 discloses an example of a detection-target-substance capture unit in which a cartridge is attached to a specimen analysis disc to form a plurality of wells. A sample solution and a buffer solution are dispensed into the plurality of wells so that an antigen-antibody reaction is promoted therein to form a plurality of reaction regions on the disc. The wells function as containers for storing the sample solution and the buffer solution.

SUMMARY

However, when the sample solution and the buffer solution are injected into the wells, bubbles may adhere to the bottom of the wells. If bubbles adhere to the surface of the disc, which forms the bottom of the wells, the antigen-antibody reaction is not promoted in a region to which bubbles adhere (hereinafter, referred to as a bubble region). Therefore, a reaction region including the bubble region is formed on the disc. As a result, in the reaction region including the bubble region, it is difficult to accurately measure the detection target substance in the reaction region.

An aspect of one or more embodiments provides a dispensing unit including: a disc which has a disc shape and includes a track region provided with recesses and projections alternately arranged in a radial direction; a cartridge which includes a penetration hole and in which a well for storing a solution is formed by the penetration hole and the track region in a state in which the cartridge is attached to the disc; and a dispensing holder which includes a holding part having a projection shape and formed corresponding to the well, and a guide hole penetrating the holding part, and is held in the cartridge by inserting the holding part into the well, wherein the guide hole has a truncated cone shape in which a first opening diameter on the holding part side is smaller than a second opening diameter on a side opposite to the holding part, and the guide hole is formed such that a center line of the guide hole is located on a line passing through the center of the disc and the center of the well when the guide hole is viewed from the dispensing holder side in a state in which the cartridge is attached to the disc and the dispensing holder is held in the cartridge.

DETAILED DESCRIPTION

[Dispensing Unit]

Figure 1:
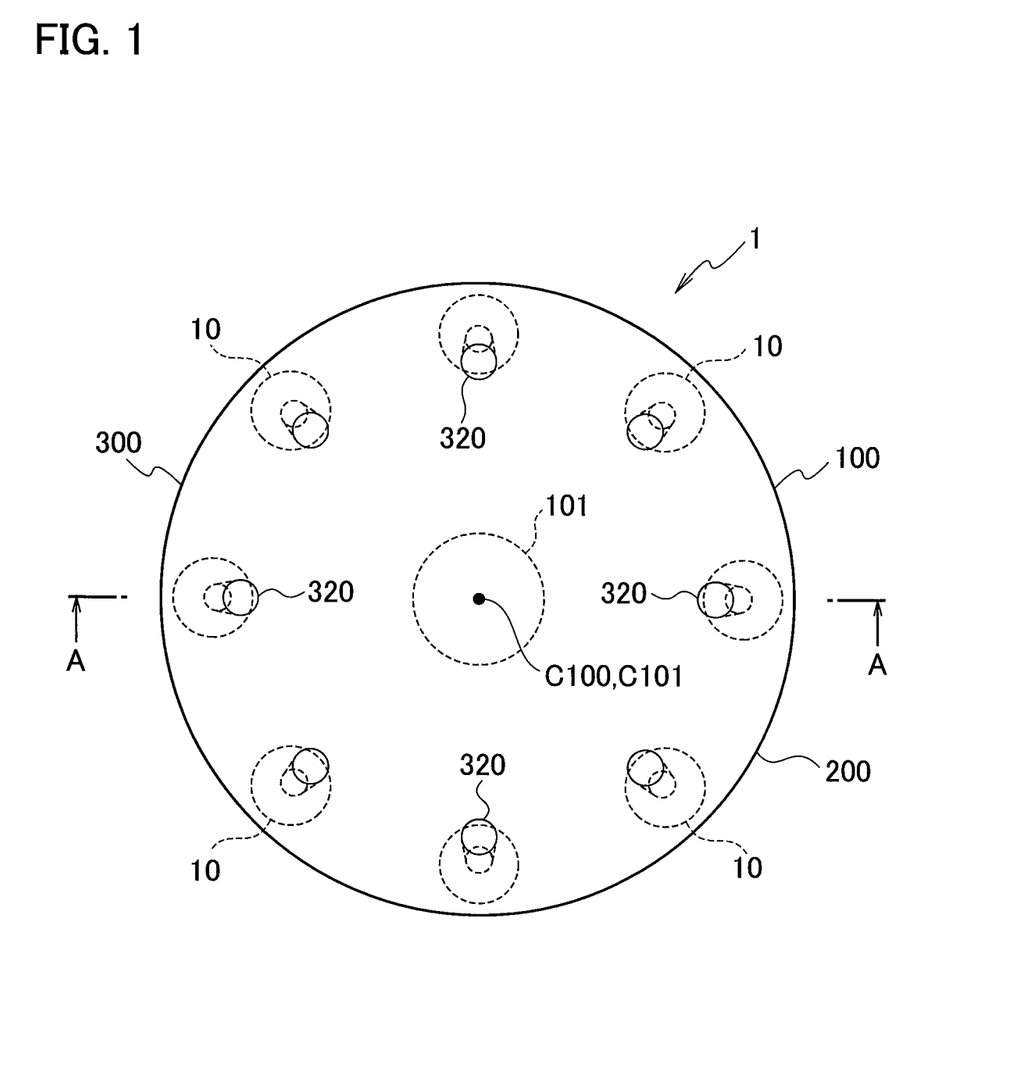
FIG. 1 is a plan view showing a dispensing unit.
Figure 2A:
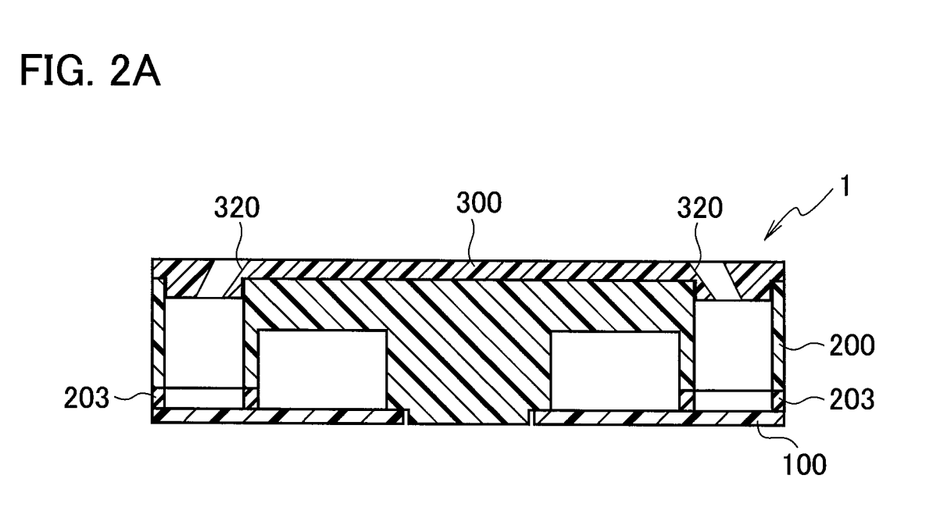
FIG. 2A is a cross-sectional view of the dispensing unit taken along line A-A in FIG. 1.
Figure 2B:
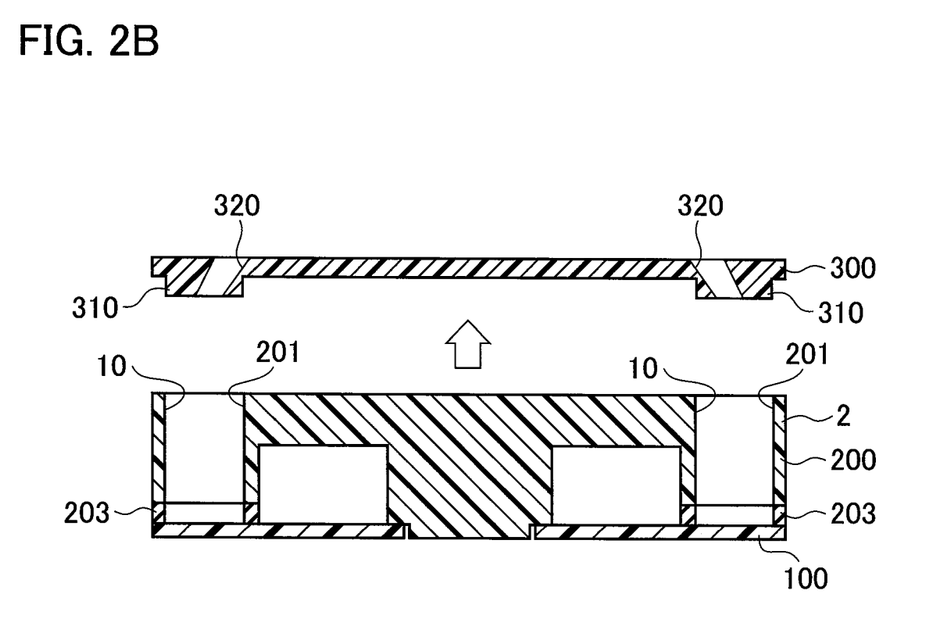
FIG. 2B is a cross-sectional view illustrating a state in which a dispensing holder is removed from a detection-target-substance capture unit.
Figure 2C:
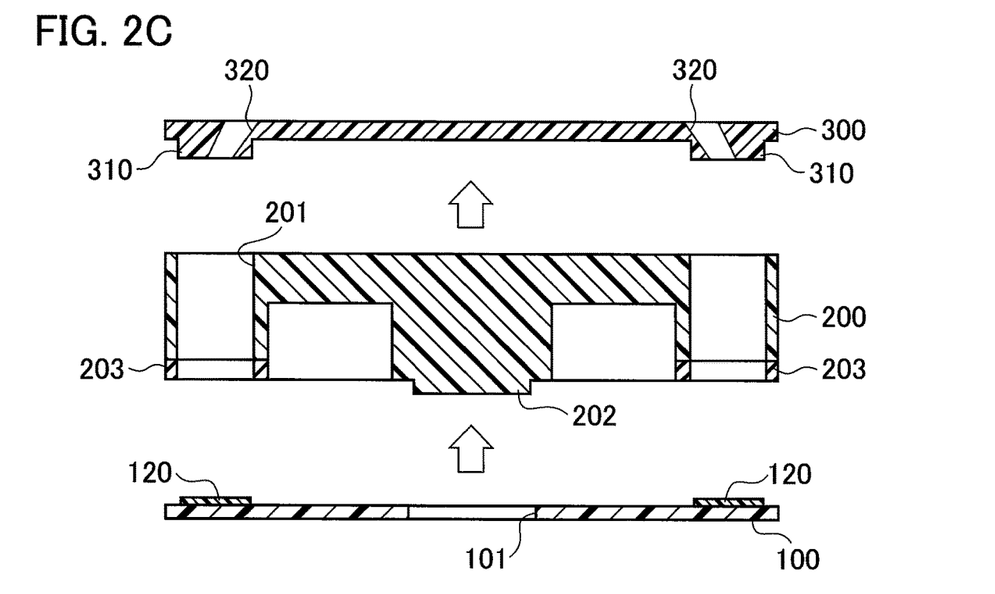
FIG. 2C is a cross-sectional view illustrating a state in which the dispensing holder and a cartridge are removed from a specimen analysis disc.
Figure 3:
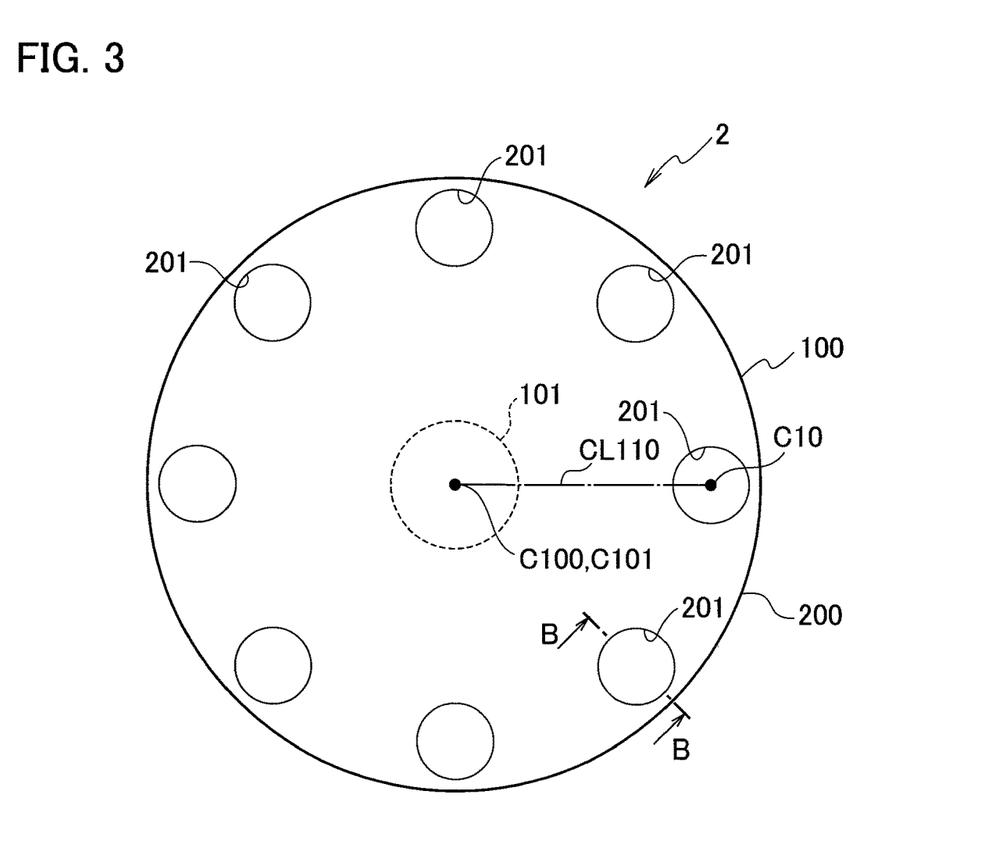
FIG. 3 is a plan view showing the detection-target-substance capture unit.
Figure 4:
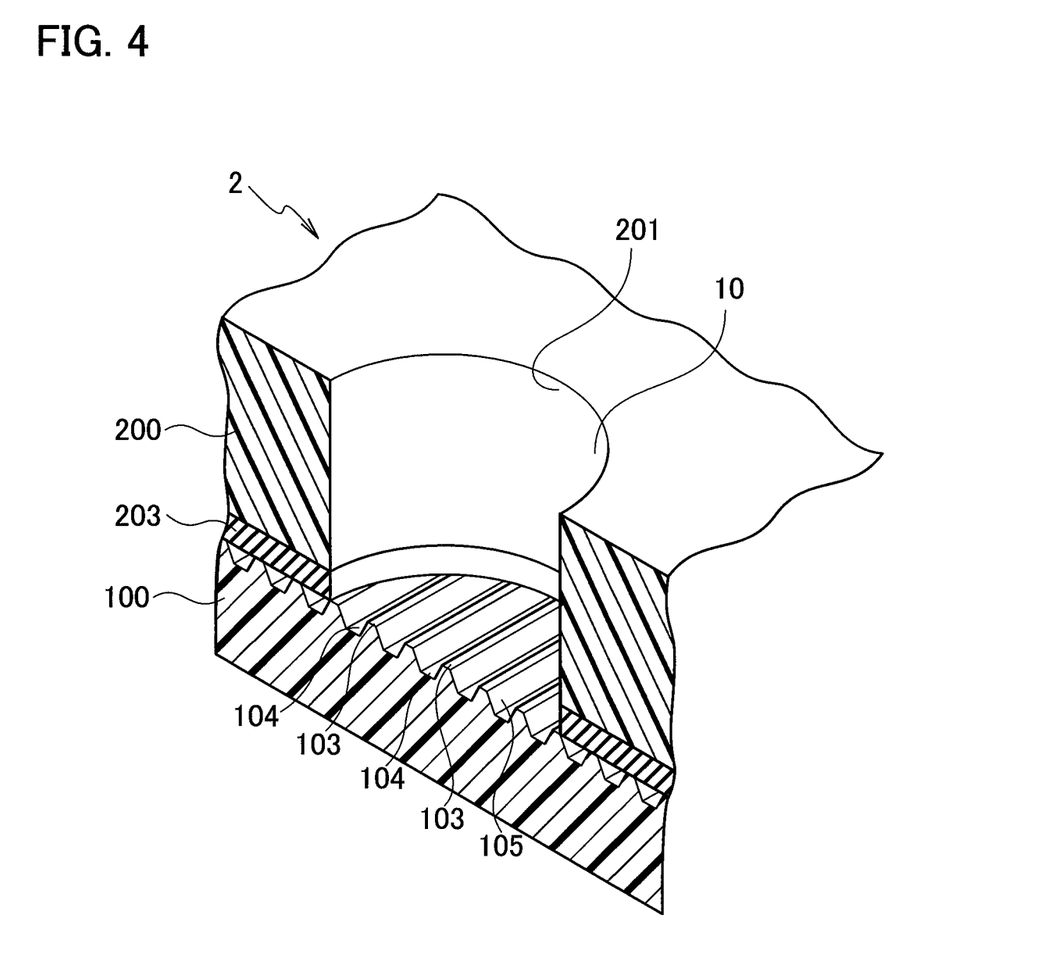
FIG. 4 is an enlarged perspective view showing a well cross-sectioned along line B-B in FIG. 3.

A dispensing unit according to one or more embodiments will be described using FIG. 1 to FIG. 4. FIG. 1 illustrates a state of the dispensing unit as viewed from a dispensing holder side. FIG. 2A shows a cross-section of the dispensing unit taken along line A-A in FIG. 1. FIG. 2B illustrates a state in which the dispensing holder is removed from a detection-target-substance capture unit. FIG. 2C illustrates a state in which a cartridge is further removed from a specimen analysis disc, from the state shown in FIG. 2B. FIG. 3 illustrates a state of the detection-target-substance capture unit as viewed from the cartridge side. FIG. 4 illustrates a partially enlarged state of a well cross-sectioned along line B-B in FIG. 3.

As shown in FIG. 1 and FIG. 2A, a dispensing unit 1 includes a specimen analysis disc 100, a cartridge 200, and a dispensing holder 300. The disc 100 has a disc shape equivalent to optical discs such as Blu-ray discs (BDs), DVDs, and compact discs (CDs).

For example, the disc 100 is formed of a resin material such as polycarbonate resin and cycloolefin polymer, which are commonly used for optical discs. The disc 100 is not limited to the optical discs described above and any optical discs according to other embodiments or conforming to prescribed standards can be used.

As shown in FIG. 1 or FIG. 2C, the disc 100 has a center hole 101 formed in the middle portion. The center C101 of the center hole 101 matches the center C100 of the disc 100.

As shown in FIG. 4, a track region 105 provided with projections 103 and recesses 104 alternately arranged in a radial direction of the disc 100 is formed on a surface of the disc 100. The projections 103 and the recesses 104 are formed in a spiral shape from an inner circumference to an outer circumference of the disc 100 around the center C101 of the center hole 101. As a result, the radial direction of the disc 100 is orthogonal to a direction along the projections 103 and the recesses 104 (hereinafter referred to as a track direction).

The projections 103 correspond to lands of an optical disc. The recesses 104 correspond to grooves of an optical disc. For example, a track pitch corresponding to a pitch of the recesses 104 in the radial direction is 320 nm, and a depth of the recesses 104 is 70 nm.

As shown in FIG. 3, the cartridge 200 is provided with a plurality of cylindrical penetration holes 201 arranged along a circumferential direction. The plurality of penetration holes 201 are arranged at regular intervals such that the respective centers are located on the common circle. For example, a diameter of the penetration hole 201 is 6 mm and a length thereof is 10 mm. As shown in FIG. 2C, the cartridge 200 includes a projection 202 in the middle portion and a plurality of seal members 203 formed corresponding to the plurality of penetration holes 201 on an outer circumference.

The seal members 203 are ring-shaped packings made of an elastically deformable member such as silicone rubber, for example. The thickness of the sealing member 203 is 1.5 mm, for example. As shown in FIG. 2C or FIG. 4, the respective seal members 203 are arranged around the plurality of penetration holes 201.

When the cartridge 200 is attached to the disc 100, the seal member 203 is elastically deformed so as to fill the recesses 104 of the track region 105. FIG. 4 illustrates a state before the seal member 203 is elastically deformed.

When the projection 202 of the cartridge 200 is inserted into the center hole 101 of the disc 100, the cartridge 200 is attached to the disc 100 to form a detection-target-substance capture unit 2 shown in FIG. 3.

As shown in FIG. 2B and FIG. 4, the detection-target-substance capture unit 2 includes a plurality of wells 10 each formed by the penetration hole 201 of the cartridge 200, the seal member 203, and the track region 105 of the disc 100. The inner circumferential surfaces of the penetration hole 201 and the seal member 203 form an inner circumferential surface of the well 10, and the track region 105 of the disc 100 forms the bottom of the well 10. Accordingly, the diameter of the well 10 is 6 mm and a depth thereof is 11.5 mm.

A solution such as a sample solution or a buffer solution is dispensed into the plurality of wells 10. The wells 10 each are containers for storing a solution such as a sample solution and a buffer solution. The seal member 203 reduces the possibility that the solution will leak from the well 100.

As shown in FIG. 2B, the dispensing holder 300 has a disc shape in which a plurality of projected holding parts 310 are formed along a circumferential direction. The plurality of holding parts 310 are arranged at regular intervals such that the respective centers are located on the common circle. The plurality of holding parts 310 are formed corresponding to the plurality of wells 10 of the detection-target-substance capture unit 2.

As shown in FIG. 2A, the holding part 210 is formed to have an outer diameter the same as or slightly smaller than the inner diameter of the well 10 (penetration hole 201). The dispensing holder 300 is held in the cartridge 200 of the detection-target-substance capture unit 2 by the holding part 310 inserted into the well 10.

Figure 5:
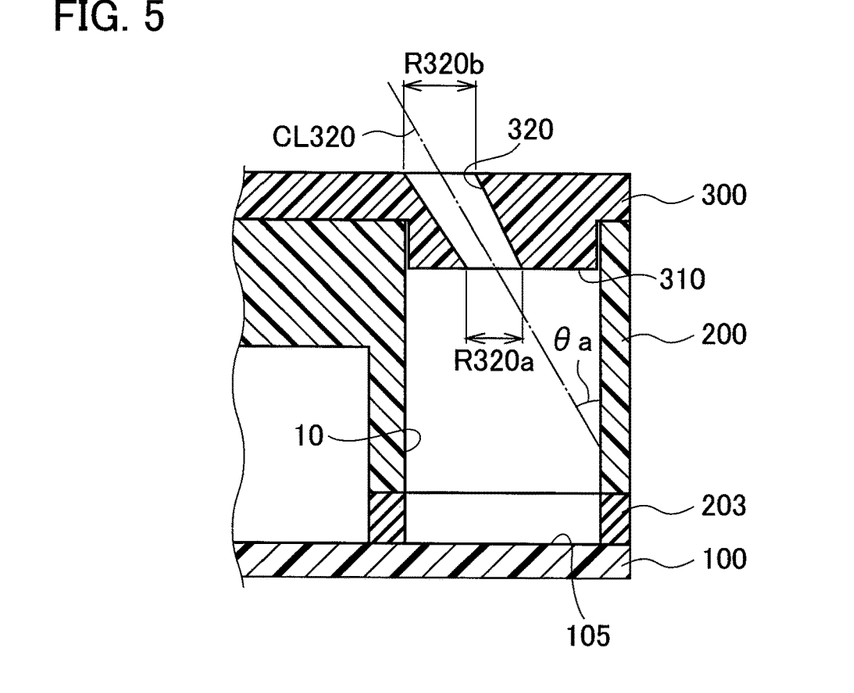
FIG. 5 is an enlarged cross-sectional view illustrating a relationship between the well and a guide hole in FIG. 2A.

The dispensing holder 300 includes a guide hole 320 penetrating the holding part 310. The guide hole 320 is formed corresponding to the holding part 310. FIG. 5 is an enlarged view of the well 10 and the guide hole 320 shown on the right side of FIG. 2A. The guide hole 320 has a truncated cone shape in which, an opening diameter R320$a$ (first opening diameter) on the holding part 310 side is smaller than an opening diameter R320$b$ (second opening diameter) on a side opposite the holding part 310, in the dispensing holder 300.

The guide hole 320 is formed such that a center line CL320 passing through the center of the opening diameter R320$a$ and the center of the opening diameter R320$b$ becomes a radial direction of the dispensing holder 300. Specifically, in a state in which the dispensing holder 300 is held in the cartridge 200 of the detection-target-substance capture unit 2, when the guide hole 320 is viewed from the dispensing holder 300 side, the guide hole 320 is formed such that the center line CL320 of the guide hole 320 is located on a line CL110 (see FIG. 3) passing through the center C100 of the disc and the center C10 of the well 10.

Accordingly, the guide hole 320 is formed such that the center line CL320 becomes the radial direction of the disc 100. The inclination angle θa of the guide hole 320 with respect to the disc 100 (specifically, an angle between the inner circumferential surface of the well 10 and the center line CL320 of the guide hole 320) is 30°, for example.

Figure 6:
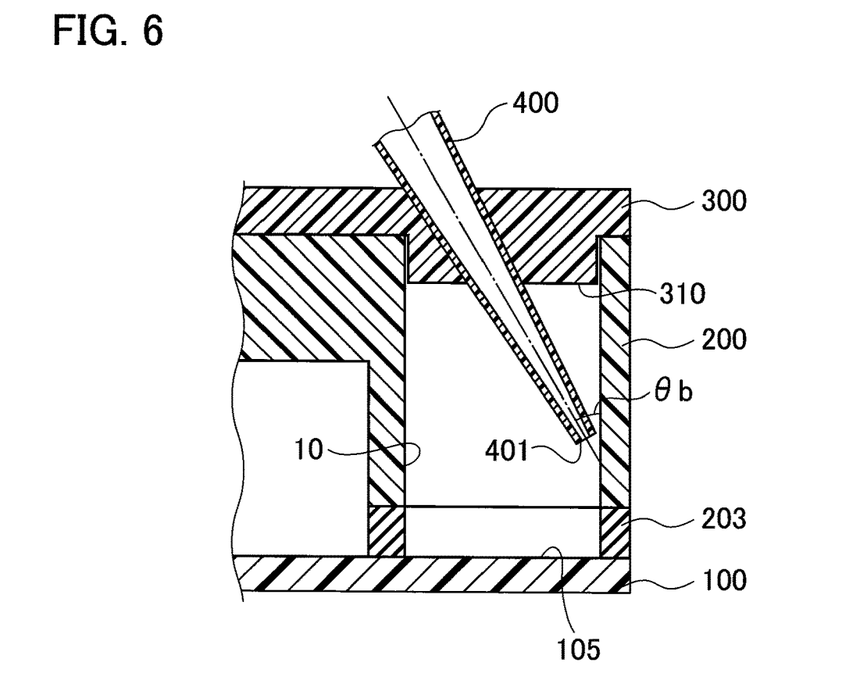
FIG. 6 is an enlarged cross-sectional view illustrating a state in which a pipette is inserted into the guide hole.

As shown in FIG. 6, a pipette 400 that injects a sample solution and a buffer solution is inserted into the guide hole 320. The guide hole 320 has a shape in which, in a state in which the pipette 400 is inserted into the guide hole 320, a tip 401 of the pipette 400 is located near the inner circumferential surface of the well 10 on the line CL110 and is located at approximately ⅓ (3 to 4 mm) of a depth (11.5 mm) of the well 10 from the bottom of the well 10.

When the inclination angle θa of the guide hole 320 with respect to the disc 100 is 30°, an inclination angle θb of the pipette 400 inserted into the guide hole 320 is also 30°. That is, the guide hole 320 guides and holds the pipette 400 so that the tip 401 of the pipette 400 is located near the inner circumferential surface of the well 10 in the radial direction of the disc 100 and makes the predetermined inclination angle θb.

[Dispensing Method]

[An example of a method of forming reaction regions on the disc 100 of the dispensing unit 1 is described using the flow chart of FIG. 7, FIG. 8A, FIG. 8B, FIG. 9A, FIG. 9B, FIG. 10, and FIG. 11. In step S1 of FIG. 7, an operator inserts the pipette 400 into the guide hole 320 of the dispensing unit 1 and dispenses a buffer solution including antibodies 501 into the plurality of wells 10 of the dispensing unit 1.

Figure 8A:
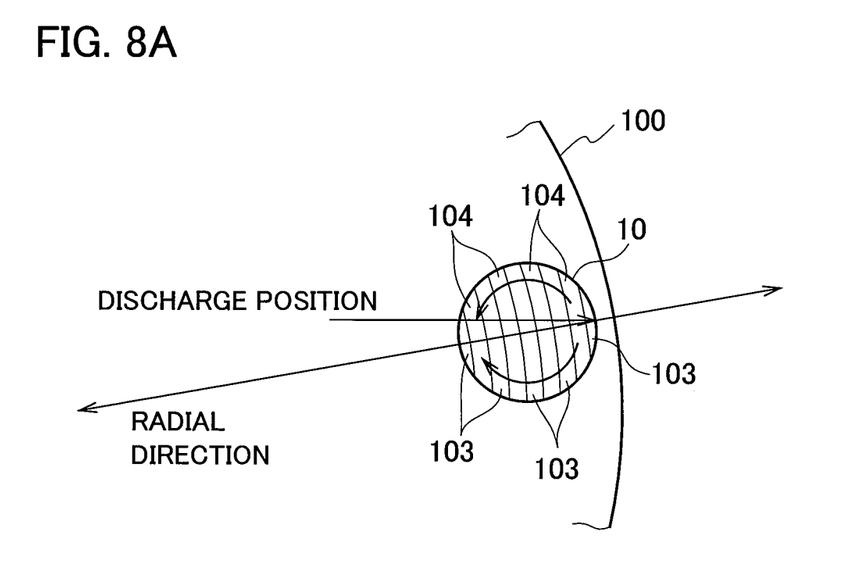
FIG. 8A is a top view illustrating a state in which a buffer solution is injected into a well 10.
Figure 8B:
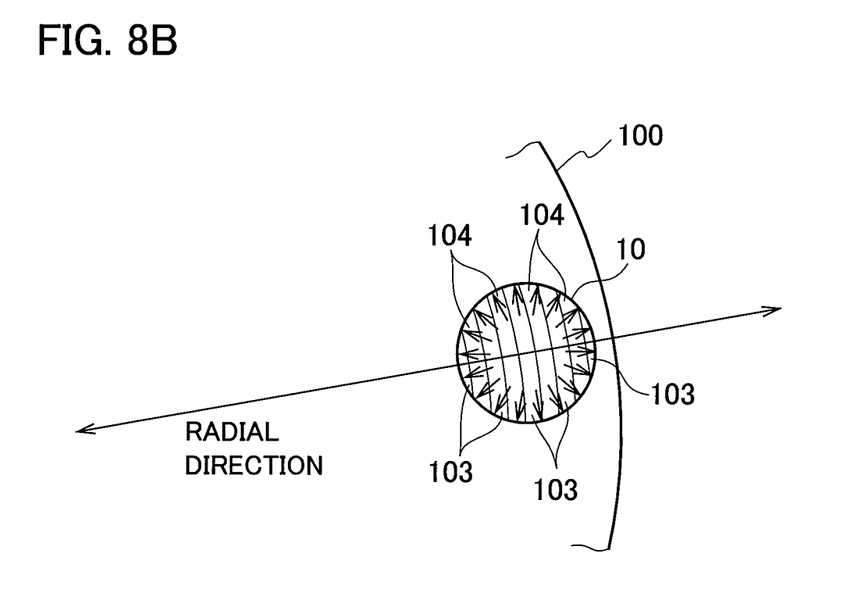
FIG. 8B is a top view illustrating a state in which the buffer solution is injected into the well 10.

FIG. 8A and FIG. 8B illustrate states in which the buffer solution is injected into the well 10. Arc-shaped arrows shown in FIG. 8A and FIG. 8B indicate flow directions of the buffer solution injected into the well 10. The tip 401 of the pipette 400 is located near the inner surface on the line C110 of the well 10. Therefore, as shown in FIG. 8A, the buffer solution is discharged on the inner circumferential surface of the well 10 on the outer side in the radial direction of the disc 100.

The buffer solution travels along the inner circumferential surface, and a boundary between the inner circumferential surface and the bottom of the well 10, and reaches the inner circumferential surface on the inner side of the well 10 in the radial direction of the disc 100, and the boundary between the inner circumferential surface and the bottom in the well 10. Therefore, as shown in FIG. 8B, the influence of the projections 103 and the recesses 104 of the disc 100 forming the bottom of the well 10 is reduced, and the buffer solution can flow over the entire of the boundary between the inner circumferential surface and the bottom of the well 10. Accordingly, bubbles generated when the buffer solution is injected into the wells 10 can be prevented from adhering.

Figure 9A:
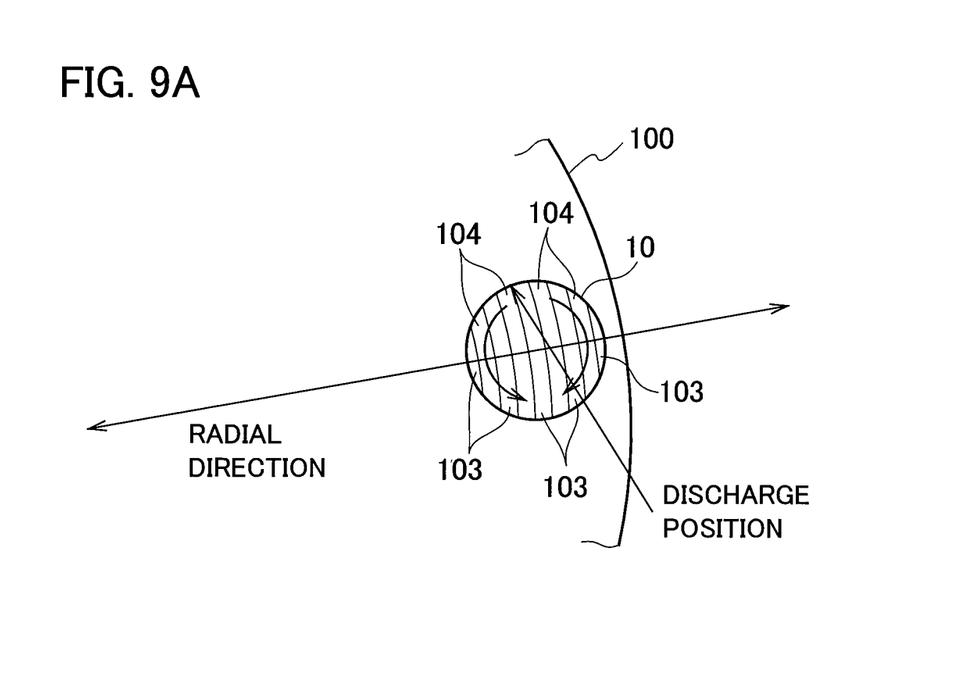
FIG. 9A is a top view illustrating a comparative example of FIG. 8A.
Figure 9B:
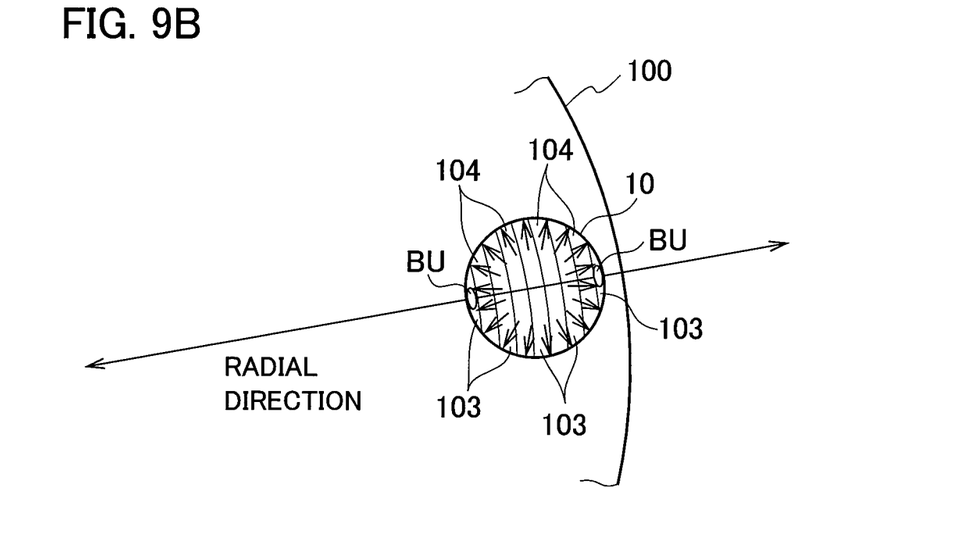
FIG. 9B is a top view illustrating a comparative example of FIG. 8B.

FIG. 9A and FIG. 9B illustrate comparative examples of FIG. 8A and FIG. 8B. FIG. 9A illustrates a state in which the buffer solution is discharged to a position different from a position in the radial direction of the disc 100, in the well 10. When the buffer solution discharged to a position different from a position in the radial direction of the disc 100 in the well 10, the buffer solution flows along the inner circumferential surface and the bottom of the well 10, the buffer solution tends to flow along the recesses 104 of the disc 100. As shown in FIG. 9B, the buffer solution tends to be blocked by the recesses 104 near the inner circumferential surface of the well 10 in the radial direction of the disc 100. Therefore, bubbles BU tend to be generated at an end on a side in the radial direction of the disc 100, in the well 10.

Figure 10:
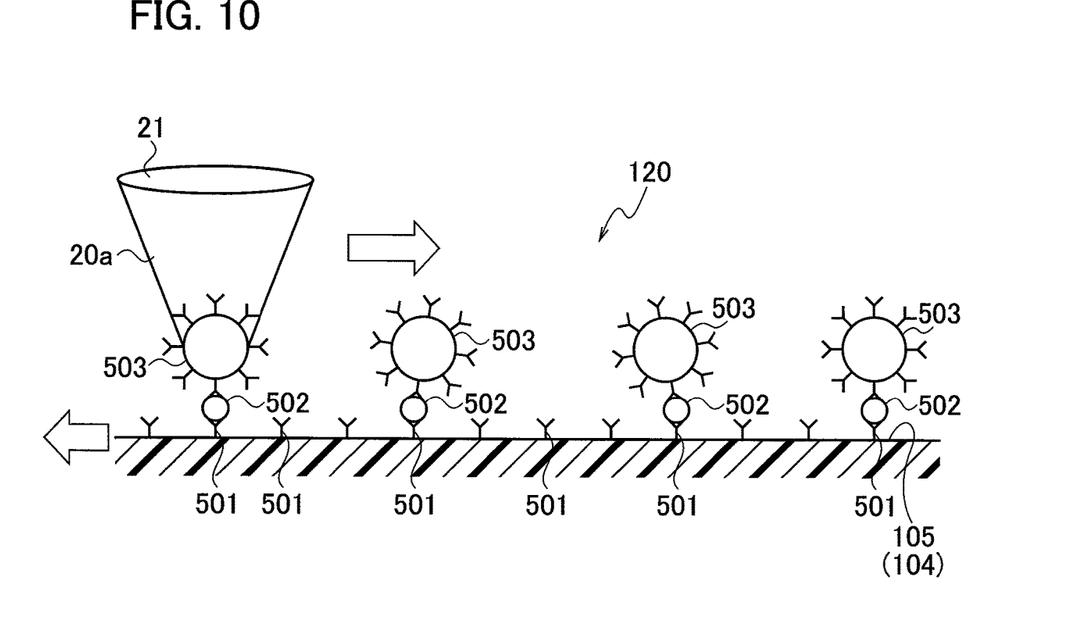
FIG. 10 is a schematic cross-sectional view illustrating a state in which detection target substances are sandwiched and captured between antibodies and nanoparticles in recesses of track region.

The operator takes the pipette 400 out of the guide hole 320, and causes the dispensing unit 1 to perform incubation for an appropriate time at an appropriate temperature. As shown in FIG. 10, the antibodies 501 are fixed on the track region 105 of the disc 100 forming the bottom of the well 10. As the comparative example shown in FIG. 9B, when the bubbles BU adhere onto the track region 105, the antibodies 501 are not fixed on the track region 205 in the bubble region to which the bubbles BU adhere.

The operator drains the buffer solution from the wells 10, and cleans the wells 10 with another buffer solution. The antibodies 501 not fixed to the track region 105 are removed due to the cleaning.

Figure 7:
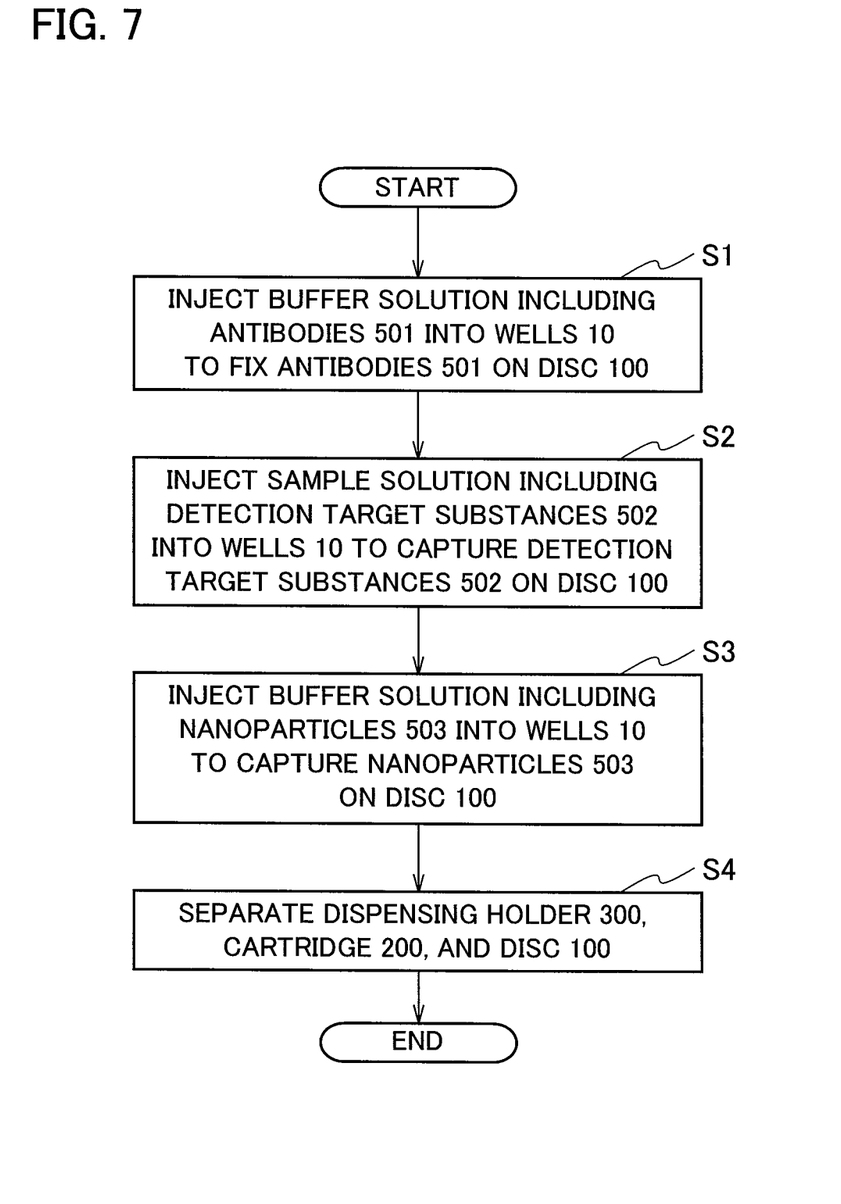
FIG. 7 is a flowchart for describing a method of forming a reaction region on a disc.

In step S2, the operator inserts the pipette 400 into the guide hole 320 of the dispensing unit 1, and injects a sample solution including detection target substances 502 into the wells 10. The detection target substances 502 are exosomes, for example. The sample solution sometimes does not include the detection target substances 502. In order to make the description easy to understand, a case in which the sample solution includes the detection target substances 502 will be described.

The sample solution is discharged to the inner circumferential surface of the well 10 on an outer side in the radial direction of the disc 100, as in the buffer solution described above. The sample solution travels along the inner circumferential surface and a boundary between the inner circumferential surface and the bottom of the well 10, and reaches the inner circumferential surface on the inner side of the well 10 in the radial direction of the disc 100 and the boundary between the inner circumferential surface and the bottom in the well 10.

Therefore, the influence of the projections 103 and the recesses 104 of the disc 100 forming the bottom of the well 10 is reduced, and the sample solution can flow over the entire boundary between the inner circumferential surface and the bottom of the well 10. Accordingly, bubbles generated when the sample solution is injected into the well can be prevented from adhering.

The operator takes the pipette 400 out of the guide hole 320, and causes the dispensing unit 1 to perform incubation for an appropriate time at an appropriate temperature. As shown in FIG. 10, the detection target substances 502 specifically bind to the antibodies 501 fixed to the track region 105 by the antigen-antibody reaction. The detection target substances 502 are thus captured on the track region 105.

The operator drains the sample solution from the wells 10, and cleans the wells 10 with a buffer solution. The detection target substances 502, not binding to the antibodies 501 and dispersed in the sample solution, and the detection target substances 502 adhering to the track region 105 by non-specific binding, which is not the antigen-antibody reaction, are removed due to the cleaning.

In step S3, the operator inserts the pipette 400 into the guide hole 320 of the dispensing unit 1, and injects a buffer solution including nanoparticles 503 serving as labels into the wells 10. The surfaces of the nanoparticles 503 are provided with antibodies that specifically bind to the detection target substances 502 by the antigen-antibody reaction.

The buffer solution is discharged to the inner circumferential surface on an outer side in the radial direction of the disc 100 in the well 10, as in the sample solution described above. The buffer solution travels along the inner circumferential surface, and a boundary between the inner circumferential surface and the bottom of the well 10, and reaches the inner circumferential surface on the inner side of the well 10 in the radial direction of disc 100 and the boundary between the inner circumferential surface and the bottom in the well 10.

Therefore, the influence of the projections 103 and the recesses 104 of the disc 100, which form the bottom of the well 10 is reduced, and the buffer solution can flow over the entire boundary between the inner circumferential surface and the bottom of the well 10. Accordingly, bubbles generated when the buffer solution is injected into the wells can be prevented from adhering.

The holding part 310 of the dispensing holder 300 is set to have a height at which the holding part 310 is not in contact with the liquid surface of the buffer solution including the antibodies 501, the liquid surface of the sample solution, and the liquid surface of the buffer solution including the nanoparticles 503, which are injected into the wells 10. The holding part 310 prevents the sample solution and the buffer solution discharged from the pipette 400 into the wells 10 from scattering. The tip 401 of the pipette 400 may or may not be in contact with the above liquid surfaces.

The operator takes the pipette 400 out of the guide hole 320, and causes the dispensing unit 1 to perform incubation for an appropriate time at an appropriate temperature. As shown in FIG. 10, the nanoparticles 503 specifically bind to the detection target substances 502 captured on the track region 105 by the antigen-antibody reaction. The nanoparticles 503 are thus captured on the track region 105, specifically, on the recesses 104 of the track region 105, in a state of binding to the detection target substances 502.

The operator drains the buffer solution from the wells 10, cleans the wells 10 with another buffer solution, and dries the wells 10. The nanoparticles 503 not binding to the detection target substances 502 and dispersed in the buffer solution are removed due to the cleaning.

In step S4, the operator separates disc 100, the cartridge 200, and the dispensing holder 300, as shown in FIG. 2C. The disc 100 is provided with a plurality of circular reaction regions 120 corresponding to the plurality of wells 10.

As shown in FIG. 10, in the reaction region 120, the nanoparticles 503 binding to the detection target substances 502 are captured on the recesses 104 of the track region 105. That is, the detection target substances 502 are sandwiched and captured between the antibodies 501 and the nanoparticles 503 on the recesses 104 of the track region 105. FIG.

Figure 11:
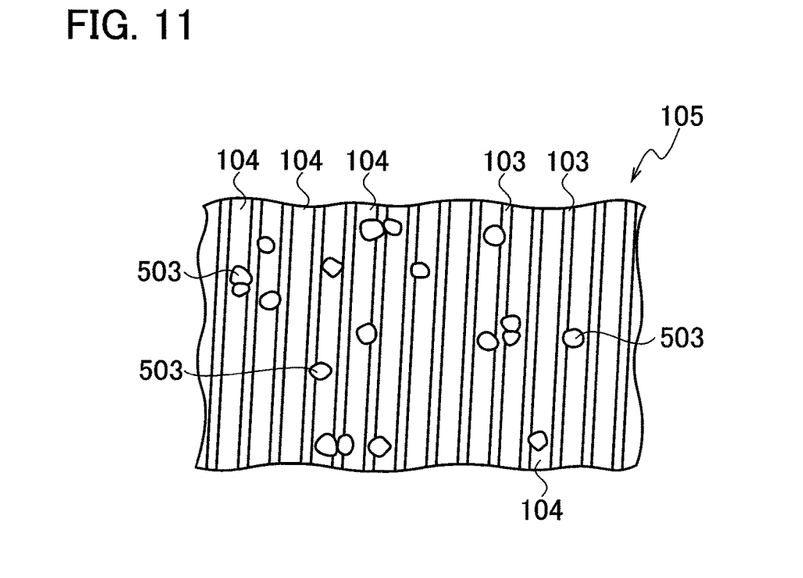
FIG. 11 is a schematic plan view illustrating a state in which the nanoparticles are captured in the recesses of the track region in a state of being coupled with the detection target substance.

11 illustrates an example of a state in which the nanoparticles 503 binding to the detection target substances 502 are captured on the recesses 104 of the track region 105.

As shown in FIG. 10, laser light 20a is condensed by a lens 21 on the recesses 104 corresponding to tracks, and scans the recesses 104 to measure the nanoparticles 503 in the reaction region 120. A total number of the nanoparticles 503 in the reaction region 120 can be calculated by adding the number of the nanoparticles 503 in all tracks of the reaction region 120. Accordingly, the detection target substances 502 specifically binding to the nanoparticles 503 can be measured indirectly.

When the bubbles BU are generated in the process of forming the reaction region 120, the detection target substances 502 and the nanoparticles 503 are not captured in the bubble region to which the bubbles BU adhere. Therefore, the nanoparticles 503 and the detection target substances 502 cannot be measured accurately. According to the dispensing unit 1 according to one or more embodiments, the pipette 400 for dispensing a solution such as a sample solution and a buffer solution can be held in the guide hole 320 of the dispensing holder 300, and the tip 401 of the pipette 400 can be positioned near the inner circumferential surface of the well 10 in the radial direction of the disc 100.

Accordingly, the sample solution and the buffer solution to be discharged from the tip 401 of the pipette 400 are discharged to the inner circumferential surface of the well 10 on one side in the radial direction of the disc 100, travel along the inner circumferential surface and the boundary between the inner circumferential surface and the bottom of the well 10, and reach the inner circumferential surface on the other side and the boundary between the inner circumferential surface and the bottom.

Therefore, the influence of the projections 103 and the recesses 104 of the disc 100, which form the bottom of the well 10 is reduced, and the sample solution and the buffer solution can flow over the entire boundary between the inner circumferential surface and the bottom of the well 10. Accordingly, bubbles BU generated when the sample solution and the buffer solution are injected into the wells 10 can be prevented from adhering.

The present invention is not intended to be limited to one or more embodiments described above, and various modifications can be made within the scope without departing from the scope of the present invention.

In the dispensing unit 1 according to one or more embodiments, the guide hole 320 has a shape in which the tip 401 of the pipette 400 inserted in the guide hole 320 is located near the inner circumferential surface of the well 10 on an outer side in the radial direction of the disc 100. The sample solution and the buffer solution may be discharged to the inner circumferential surface of the well 10 in the radial direction of the disc 100.

Accordingly, the guide hole 320 may have a shape in which the tip 401 of the pipette 400 is located near the inner circumferential surface of the well 10 on the inner side in the radial direction of the disc 100. The tip 401 of the pipette 400 may also be in contact with the inner circumferential surface of the well 10.

In the dispensing unit according to one or more embodiments, the inclination angle of the guide hole 320 and the pipette 400 to the inner surface of the well 10 is set to 30°. However, the inclination angle of the guide hole 320 and the pipette 400 may be appropriately set according to the shapes of the well 10 and the pipette 400.

The guide hole 320 of the dispensing holder 300 may be provided with a groove in an inner circumferential surface thereof. In a state in which the pipette 400 is inserted into the guide hole 320, the groove can prevent the inside of the well 10 from being sealed. Thus, the sample solution and the buffer solution can be smoothly injected into the wells 10.

In the dispensing unit 1 according to one or more embodiments, the cartridge 200 is configured to include the penetration hole 201 and the seal member 203, but may be configured to include no seal member 203. In this case, the well 10 is formed by the penetration hole 201 of the cartridge 200 and the track region 105 of the disc 100. The inner circumferential surface of the well 10 is defined by an inner circumferential surface of the penetration hole 201. The bottom of the well 10 is defined by the track region 105 of the disc 100.

What is claimed is:

1. A dispensing unit comprising:
    a disc which has a disc shape and includes a track region provided with recesses and projections alternately arranged in a radial direction;
    a cartridge which includes a penetration hole and in which a well for storing a solution is formed by the penetration hole and the track region in a state in which the cartridge is attached to the disc; and
    a dispensing holder which includes a holding part having a projection shape and formed corresponding to the well, and a guide hole penetrating the holding part, and is held in the cartridge by inserting the holding part into the well, wherein
    the guide hole has a truncated cone shape in which a first opening diameter on the holding part side is smaller than a second opening diameter on a side opposite to the holding part, and
    the guide hole is formed such that a center line of the guide hole is located on a line passing through the center of the disc and the center of the well when the guide hole is viewed from the dispensing holder side in a state in which the cartridge is attached to the disc and the dispensing holder is held in the cartridge.

2. The dispensing unit according to claim 1, wherein in a state in which a pipette that injects the solution into the well is inserted into the guide hole, the guide hole has a truncated cone shape by which a tip of the pipette is located near an inner circumferential surface of the well.

3. The dispensing unit according to claim 1, wherein
    the cartridge includes a seal member disposed around the penetration hole, and
    the well includes the penetration hole, the seal member, and the track region.

* * * * *